United States Patent Office 2,749,296
Patented June 5, 1956

2,749,296

PROCESS FOR THE RECOVERY OF BERYLLIUM OXIDE

Tarapada Banerjee and Phani Bhusan Chakravarty, Jamshedpur, India, assignors to The Council of Scientific and Industrial Research, New Delhi, India No Drawing. Application February 19, 1952, Serial No. 272,514

6 Claims. (Cl. 204—96)

This invention relates to the recovery of beryllium oxide from a solution of beryllium-sodium fluoride.

For preparation of beryllium oxide from beryl, the usual procedure that is followed runs thus:

Beryl is finely ground, mixed with sodium ferric fluoride and then sintered in an electric furnace at 700° C. When the reaction is complete, the sintered mass is again finely ground and extracted with water. Only beryllium goes into solution as sodium beryllium fluoride leaving aluminium behind as cryolite. After purification from iron, a clear filtrate of sodium beryllium fluoride is obtained which forms the starting material both for the hitherto known chemical method and the method of the present invention for the preparation of beryllium oxide.

According to the chemical method, caustic soda is added to the solution whereby impure beryllium hydroxide is precipitated. The precipitate is washed several times with water to free it as far as possible from free alkali and is then dissolved in concentrated sulphuric acid. After filtration, gaseous ammonia is passed into it when beryllium hydroxide is precipitated. The precipitate is then given thorough washing with water till free from sulphates. After usual filtration, drying and ignition, the oxide is obtained.

By the method of the present invention, we eliminate the several tedious processes of basic and acid washing, separation and filtration involved in the recovery of beryllium oxide from the beryllium-sodium fluoride solution according to the hitherto known process.

The process according to the present invention comprises recovering beryllium oxide from the solution of beryllium-sodium fluoride by electrolysis, the actual current efficiency being about 100%.

When the sintered mass obtained by sintering beryl with sodium ferric-fluoride at 700° C. is extracted with water, sodium beryllium fluoride goes into solution. Sodium silico fluoride is also a good flux for beryl, but sodium ferric fluoride is preferred, as less of silica is thereby introduced into the stock solution of sodium beryllium fluoride. The solution of sodium beryllium fluoride after purification forms the catholyte of the diaphragm electrolytic cell. The anolyte is a solution of sodium chloride (10%) and is separated from the catholyte by a diaphragm. Both the anode and cathode are graphite rods.

Use of graphite rods as electrodes is important since the product beryllium oxide obtained in the catholyte chamber is free from any contamination from the cathode. Graphite rod which forms the anode is not attacked by the chlorine evolved at the anode.

The range of current density employed is from 0.94 to 6.3 amp./dcm.$^2$. Electrolysis is effected at room temperature. The current efficiency in all these cases varies from 90 to 100, depending on current density and duration of electrolysis. In the intermittent process, electrolysis was carried out for a period of two hours.

The optimum current density is 2.20 amp./dcm.$^2$ when the current efficiency is 85.11% and percentage recovery is 83.88. A still higher current efficiency of 96.85% is obtained at current density 1.57 amp./dcm.$^2$ when the percentage recovery is, however, less being only 68.12.

The electrolytic cell consists of a vessel, e. g. of cylindrical shape, made of glass, glazed porcelain or any other suitable material which will not contaminate the product. The anode and cathode chambers are separated by means of a diaphragm such as porous-pot (clay ceramic) diaphragm or asbestos cloth. Graphite rods are used as electrodes. The outer compartment which is the cathode chamber, contains the solution of sodium beryllium fluoride while the inner compartment, the anode chamber, contains sodium chloride. When current is switched on, beryllium hydroxide is formed at the cathode whereas chlorine is evolved at the anode. When electrolysis is stopped, the slurry contained in the outer compartment is taken out, filtered and washed and beryllium oxide estimated in it in the usual way.

In the course of our investigation we have found that the method works very well. But one peculiar observation which was made by us, is that at low (0.94 amp./dcm.$^2$) current density, the current efficiency goes much above 100 (sometimes as high as 114). On further investigation we located the cause for this as being due to the diaphragm which, in course of electrolysis, contaminates the products with iron, aluminium and silicon. This is suspected to be due to the action of fluorine. This is also corroborated by our recent experiments in which we used two separate vessels containing the anolyte and catholyte and connecting them by means of agar bridges. The current efficiency in all these cases varied from 90 to 100 depending on the current density and duration of electrolysis. In all cases the electrolysis was carried out at room temperature.

By the use of diaphragm cell with arrangement for continuous electrolysis, a very high current efficiency is more or less guaranteed and the depleted catholyte may be regenerated by using it for further extraction of the sintered product.

The present process is advantageous in spite of the fact that the porous clay pot diaphragm is slightly affected during the process. The purity of the product in terms of beryllium oxide under the above-mentioned conditions is between 96–79%. It may be added here that by the tedious chemical method, the purity of the product is of the same order as that obtained by using the porous clay pot diaphragm. If asbestos cloth is used as the diaphragm the contamination by silica is reduced but other contaminants are liable to be introduced into the beryllium oxide.

Chlorine evolved at the anode from sodium chloride by displacement of chlorine by fluorine is a valuable by-product obtained at no further cost. It is also possible to separate now and then sodium fluoride from its mixture with sodium chloride in the anolyte after prolonged electrolysis.

We claim:

1. In the manufacture of beryllium oxide, the process which comprises placing an aqueous solution of beryllium-sodium fluoride in the cathode compartment of a diaphragm cell having an inert diaphragm, an inert anode and an inert cathode, placing an aqueous electrolytic solution in the anode compartment, passing an electric current from the anode to the cathode at a current density of from about 0.94 to 6.3 amp./dcm.$^2$ and recovering beryllium oxide from the slurry thereby formed in the cathode compartment.

2. The process of claim 1 wherein the inert diaphragm is a porous clay ceramic.

3. The process of claim 1 wherein the inert diaphragm is an asbestos cloth.

4. The process of claim 1 wherein the anolyte is a solution of sodium chloride.

5. The process of claim 1 wherein a graphite anode and a graphite cathode are employed.

6. In the manufacture of beryllium oxide, the process which comprises placing, in the cathode compartment of a diaphragm cell equipped with an inert diaphragm and graphite anode and cathode, an aqueous solution of beryllium-sodium fluoride obtained by leaching with water a sintered mass obtained by sintering beryl with sodium ferric-fluoride, placing in the anode compartment a solution of sodium chloride having a concentration of about 10% by weight, electrolyzing the solution of beryllium-sodium fluoride at about room temperature by passing an electric current from the anode to the cathode at a current density of from about 0.94 to 6.3 amp./dcm.$^2$, separating beryllium oxide from the slurry formed in the cathode compartment and employing the remaining solution for further extraction of beryllium-sodium fluoride from said sintered mass.

References Cited in the file of this patent

Berges, Annales de Chimie, Series 12, Tome 5 (1950), pp. 113–116, 129–132.

Price et al.: Engineering, vol. 148 (1939), pp. 675–76.